Patented July 7, 1942

2,288,687

UNITED STATES PATENT OFFICE 2,288,687

MANUFACTURE OF DINITRILES

Henry Dreyfus, London, England, assignor to Celanese Corporation of America, a corporation of Delaware No Drawing. Application May 21, 1940, Serial No. 336,355. In Great Britain June 7, 1939

2 Claims. (Cl. 260—464)

This invention relates to the manufacture of organic compounds and, more particularly, to the manufacture of the nitriles of organic carboxylic acids.

According to the invention, the nitrile of an organic carboxylic acid is produced by dehydrating the corresponding amide by reaction with the anhydride of an aliphatic monocarboxylic acid. Lower fatty acid anhydrides are particularly useful for the purposes of the invention and it is preferred to use acetic anhydride, as this compound, while being relatively cheap, acts in a very efficient manner.

The new process is of particular importance in the manufacture of the dinitriles of aliphatic dicarboxylic acids e. g. of suberic acid, sebacic acid and, especially, adipic acid, and the invention will be described more particularly in connection with the production of adiponitrile. It will be understood, however, that the process can also be applied to the manufacture of dinitriles of other dicarboxylic acids, including aromatic dicarboxylic acids and mixed aliphatic-aromatic dicarboxylic acids, e. g. benzylmalonic acid, the manufacture of dicyanogen from oxamide and also to the manufacture of the nitriles of monocarboxylic acids, especially the nitriles of higher fatty acids e. g. lauric, palmitic and stearic acids.

The reaction can be carried out by simply heating together the amide and the anhydride in the presence or absence of diluents or solvents, reaction temperatures in the neighbourhood of 100° C. or higher, e. g. up to 120 or 130° C. being very satisfactory. Thus, acetic anhydride can be used, and is very efficient in operation, at its boiling point.

The water removed from the amide to form the nitrile combines with the anhydride to form the corresponding acid, but while this reaction theoretically requires two molecules of, for example, acetic anhydride for each molecule of adipamide, it has been found advantageous in practice to carry out the reaction in the presence of a large excess of anhydride. Thus, in making adipodinitrile from adipamide and acetic anhydride, it has been found best to use 10 to 15 molecules of anhydride to each molecule of the diamide and these proportions, which are equivalent to 5 to 7½ times the quantity of anhydride theoretically required, are of general application.

An even greater excess of anhydride can be employed if desired, and this result can in part be achieved without employing an excessively large quantity of anhydride by heating the anhydride to the reaction temperature and then adding the amide a little at a time so that the portions of the amide added at the beginning of the process are brought into contact with a very large excess of anhydride indeed. For instance, to a quantity of anhydride maintained at the desired reaction temperature and representing say, 50 to 75 molecular proportions, there may be added about one molecular proportion of the amide, and then at successive intervals of 10 to 20 minutes, further similar quantities of amide added until 5 molecular proportions in all have been introduced, after which the mixture can be maintained at the reaction temperature for a sufficient period of time to complete the reaction, or to carry it to the desired stage, a result which can generally be achieved by heating for a period of somewhat more than 5 hours, e. g. 5 to 7 hours. By carrying out the process in this way, a high yield of adipodinitrile can be obtained from adipamide using boiling acetic anhydride as the other reagent.

When the process is carried out at or near the boiling point of either of the reagents or of any other ingredient of the reaction mixture, it is, of course, desirable to employ a reflux condenser to prevent the escape of vapours thus produced. If desired, such a reflux condenser may be operated so as to permit removal of the aliphatic acid produced in the process continuously with its formation. Where solvents or diluents are present, these may, if desired, be such as form an azeotropic mixture of low boiling point with the acid so as to assist its removal. Alternatively, any solvent or diluent employed may be of relatively non-volatile character.

When, as is the case with adipamide and the diamides of other dicarboxylic acids, the amide used is a solid compound it is sufficient to introduce the amide as a fine powder but it can also be used as a solution or suspension in an inert liquid, e. g. of hydrocarbon nature, or in solution or suspension in part of the liquid anhydride to be used in the process.

While, as has been indicated, the process of the invention is best carried out by adding the amide, preferably a little at a time, to the anhydride maintained at the reaction temperature the invention is not limited in this respect. For instance, the vapour of acetic or other aliphatic anhydride may be introduced into a hot solution or suspension of the amide. Such a process may be carried out at a temperature such that the aliphatic acid formed passes off continuously in vapour form and the medium in which the amide is dissolved or suspended may be of the nature mentioned above, i. e. adapted to form a lower boiling azeotropic mixture with the aliphatic acid, or may be of relatively non-volatile character. Again, the reagents may be heated together in an autoclave, although the process is one which can be carried out very efficiently at normal atmospheric pressure and may even be conducted under reduced pressure.

Although the process of the invention has been described more particularly with regard to the production of the nitriles from the corresponding amides, there may also be used as starting materials in the process the ammonium salts of the corresponding acids. It is, however, preferred to use the amides alone since a smaller quantity of anhydride is thereby consumed and, moreover, because the ammonium salts, especially of the dicarboxylic acids, exhibit a tendency to decompose at the reaction temperatures and thus result in the production of lower yields of the nitriles.

Where an ammonium salt is used as starting material it is desirable, as when starting from the amide, to use considerably more of the anhydride than is theoretically required. For instance, with diammonium salts of dicarboxylic acids, quantities of anhydride equal to 20 or 30 or even more, e. g. up to 50 molecules per molecule of diammonium salt may be used. It is moreover preferred to add the ammonium salt a little at a time to the anhydride maintained at the reaction temperature in the manner described with reference to the use of the amides. The reaction temperatures may be those mentioned in connection with the use of the amides. If desired, the operation can be carried out in two stages, the amide first being produced by reacting the ammonium salt with say, in the case of a diammonium salt of a dicarboxylic acid, 10 to 15 parts of anhydride, and subsequently adding a further quantity of anhydride to assist in the production of the dinitril. In such a process, if the acid formed simultaneously with the amide is not removed continuously with its production, it may be partly or wholly distilled off before adding such a further quantity of anhydride.

The following example illustrates the invention as applied to the production of adiponitrile:

*Example*

Acetic anhydride is heated to its boiling point in a reaction vessel fitted with a reflux condenser and to the boiling anhydride adipamide is added in quantity equal to 25 grams for each litre of acetic anhydride in the reaction vessel, further similar quantities of adipamide being added at intervals of 15 minutes until the total added is equal to 125 grams per litre of the anhydride. The mixture is then maintained at its boiling point for a period of about six hours, after which the reflux condenser is replaced by a horizontal condenser and the acetic acid produced and unused acetic anhydride distilled off, the distillation being continued subsequently, and the fraction coming over between 285° and 300° C. being collected separately. This fraction on a single redistillation gives adiponitrile as a clear pale yellow liquid boiling at 295° C., and of more than 98% purity.

Having described my invention, what I desire to secure by Letters Patent is:

1. Process for the production of adipic acid dinitrile, which comprises adding to boiling acetic anhydride a quantity of adipamide equal to approximately one molecular proportion to each 50–75 molecular proportions of anhydride, adding further similar quantities of amide at short intervals until the anhydride present initially corresponds to 5–7½ times that theoretically required to react with all the amide added, maintaining the resultant mixture at the boiling point for a sufficient period of time to complete the reaction, and thereafter separating by distillation the nitrile produced from the residual anhydride and the corresponding acid formed.

2. Process for the production of adipic acid dinitrile, which comprises adding to boiling acetic anhydride a quantity of adipamide equal to 1 molecular proportion for each 50–75 molecular proportions of anhydride, adding four further similar quantities of amide at intervals of 10–20 minutes, maintaining the resultant mixture at the boiling point for a period of 5–7 hours, and thereafter separating by distillation the nitrile produced from residual anhydride and the corresponding acid formed.

HENRY DREYFUS.